United States Patent [19]

Diessel et al.

[11] Patent Number: 5,185,380
[45] Date of Patent: Feb. 9, 1993

[54] RECYCLING OF THERMOSETTING POLYURETHANE SOFT FOAM

[75] Inventors: Cornelia Diessel, Wolthausen; Carsten Kliwer, Nienhagen; Gerhard Burak; Ehrenfried Blümel, both of Adelheidsdorf; Christoph Kittel, Nienhagen, all of Fed. Rep. of Germany

[73] Assignee: Stankiewicz GmbH, Fed. Rep. of Germany

[21] Appl. No.: 719,148

[22] Filed: Jun. 21, 1991

[30] Foreign Application Priority Data

Jun. 28, 1990 [DE] Fed. Rep. of Germany ....... 4020602

[51] Int. Cl.$^5$ .......................... C08J 11/04; C08J 11/06
[52] U.S. Cl. ..................................... 521/49; 521/45.5; 264/115; 264/126; 264/DIG. 69
[58] Field of Search ................. 521/45.5, 49; 264/115, 264/126, DIG. 69

[56] References Cited

U.S. PATENT DOCUMENTS

| | | | |
|---|---|---|---|
| 2,471,043 | 6/1945 | Schenk | 521/45.5 |
| 2,878,153 | 2/1956 | Hackländer | 264/DIG. 69 |
| 3,263,010 | 7/1966 | Shultz | 264/126 |
| 3,880,977 | 4/1975 | Gealer et al. | 264/DIG. 69 |

FOREIGN PATENT DOCUMENTS

| | | |
|---|---|---|
| 37860 | 10/1981 | European Pat. Off. |
| 3925029 | 7/1990 | Fed. Rep. of Germany |
| 3925354 | 2/1991 | Fed. Rep. of Germany |
| 1595431 | 8/1981 | United Kingdom |

Primary Examiner—Paul R. Michl
Assistant Examiner—Andrew E. C. Merriam
Attorney, Agent, or Firm—Marshall, O'Toole, Gerstein, Murray & Bicknell

[57] ABSTRACT

The invention relates to a process for recycling thermosetting polyurethane soft foams in which they are comminuted in a mill, irrespective of their initial shape, density and structure, and are then pressed under the influence of pressure and elevated temperatures to high-strength sheets of various structures.

17 Claims, 1 Drawing Sheet

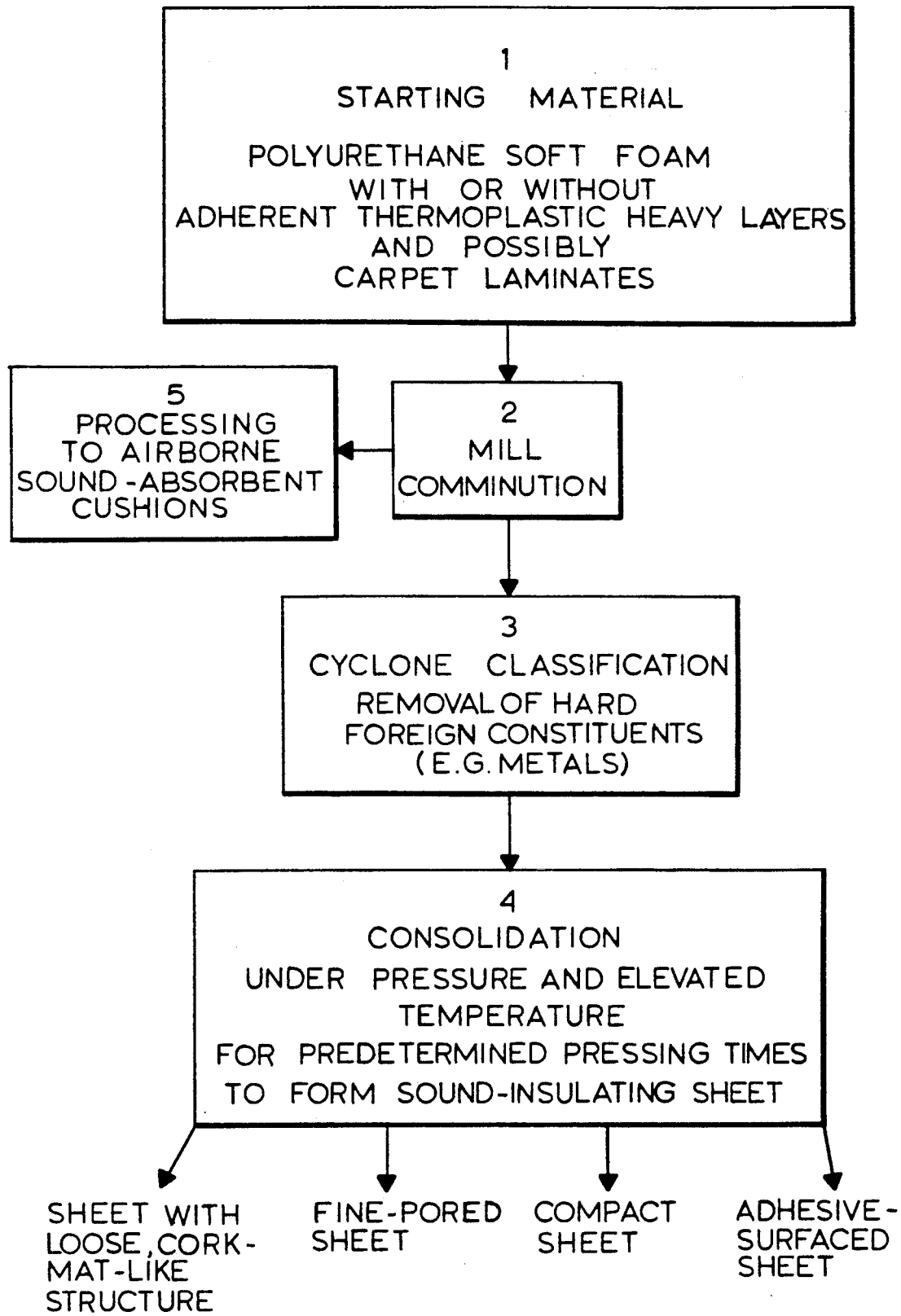

RECYCLING OF THERMOSETTING POLYURETHANE SOFT FOAM

TECHNICAL FIELD OF THE INVENTION

The invention relates to a process for recycling thermosetting polyurethane soft foam and to the use of materials and systems made by the process, in particular for sound insulation, for example in automobile manufacture.

BACKGROUND OF THE INVENTION AND PRIOR ART

To preserve sources of raw materials and to reduce the amount of plastics materials requiring disposal, numerous recycling process are being investigated. Thus it has long been common practice in the manufacture of articles from thermoplastic materials by injection moulding to add a certain percentage of recycled material, generally of the same kind, without any marked reduction in the quality of the material in comparison to the virgin product.

While thermoplastic materials are very suitable for use in such processes, thermosetting plastics (duroplastics) and duromers are not. Because of their chemical structure it is not at present thought to be possible to recycle these products and return them to a material circuit in the same way as thermoplastic materials.

Thermosetting plastics are synthetic materials that are, as a rule, amorphous and retain their strength up to their decomposition temperature. The chemical reaction which is usually brought about by heating leads to irreversible cross-linking. At higher temperatures the thermosetting plastics decompose.

Moreover the duromers and the polyurethane soft foams are by definition fully reacted and are therefore generally not thought to be susceptible to further processing. Consequently it has not hitherto been considered possible to carry out economical recycling, particularly for direct reuse in the form of sound insulating bodies.

Some complex and expensive recycling processes have however been described by Brandt: Kunststoff-Journal 9 (1975), No. 5, pp. 22-24. To the comminuted-to-pulverised waste foam, for example from cutting up foam slabs, a solvent consisting of dialkanolamine in glycol heated to 185°-210° is added and the mixture is allowed to stand for about 20 hours. The chemical reactions that occur when this is done yield regenerated polyols in a very high percentage yield based on the total weight of raw material. This procedure, however, is not practicable on economic grounds.

The "cracking" of foams by hydrolysis, in which OH-groups are caused to combine with other molecules by temperature and pressure, is also known. The resulting mixture of polyols is not, however, the same as the polyols that are used as starting material for foam manufacture.

Processes are also known by means of which cut foams consisting, for example, of polyether-polyols and isocyanates, can be thermally pressed to shaped articles. These are applied mostly to pieces that have been cut out from foamed slab material.

OBJECT OF THE INVENTION

It is accordingly an object of the invention to provide a simple and economically usable process for recycling thermosetting polyurethane soft foams.

SUMMARY OF THE INVENTION

According to the invention a process for recycling waste thermosetting polyurethane soft foam comprises the steps of comminuting the soft foams, irrespective of their original shape, their density and their structure, to granules, consolidating the comminuted soft foam in a mold under pressure and at elevated temperature to a final thickness of a few millimeters and pressing it, without addition of polymeric binder, for a predetermined pressing time, to form high-strength sheets of different structures.

In this process comminuted polyurethane soft foams made according to various recipes and by different manufacturing processes, and hence having different densities and structures, are processed without the addition of polymeric binder that is required in the case of the known composite flake foam to form sheets of different structures. These structures resemble those of cork mats.

BRIEF DESCRIPTION OF THE DRAWINGS

THE FIGURE shows diagrammatically the process of the invention for recycling polyurethane soft foam.

DETAILED DESCRIPTION OF A PREFERRED EMBODIMENT OF THE INVENTION

The starting materials 1, which may have any desired density, are comminuted to granules, e.g. of about the size of lentils, by means of a mill 2. The foams to be recycled may range in density from 15 to 1000 kgm$^{-3}$. The materials can be roughly subdivided on the basis of their original method of production or use. Thus cut foams cover the segment 15-40 kgm$^{-3}$, upholstery foams about 40-60 kgm$^{-3}$, viscoelastic foams for sound insulation 60-80 kgm$^{-3}$, with upper limits for special molded foams for airborne sound insulation in the range 500-1000 kgm$^{-3}$.

The comminuted soft foams are subjected to a cyclone classification 3 to remove hard foreign constituents, such as metals and hard PVC, for example, unless it is certain that no such constituents are present. After the classification 3 the comminuted soft foams are passed to a consolidation step 4.

In this step they are generally charged into a mold without any further treatment and gradually consolidated by the action of pressure and elevated temperature to sheet having a final thickness of a few millimeters, preferably 1-7 mm. In one example of a consolidation process the closing speed of the press was 1 mm/second. The press then stopped after reaching the final sheet thickness in pressure equilibrium. Typical pressures and pressing times used are given by way of example In Tables 1 and 2. Table 1 relates to the production of non-adhesive sheet, and Table 2 to the production of adhesive sheet.

These tables also give the workpiece temperatures, i.e. the temperatures at the surface of the sheet. The temperature limits are determined by the physicochemical processes that take place. Cracking of the molecular chains is made possible by elevated temperature and pressure. Temperatures higher than 210° C. lead to such severe shortening of the molecular chains that the material no longer has adequate cohesion, and a greasy film of oily cracking products forms on the surface. The material to be pressed must not contain any constituents with melting points less than 150° C.

The recycled foam plastic products obtained by the process of the invention are suitable for sound insulation. They can be processed to have adhesive surfaces, and then bring about marked attenuation of solid-borne sound by positive coupling, e.g. to automobile body panels. The density of about 400–2000 kgm$^{-3}$, the use of layers of suitable thicknesses and the flexibility produces attenuation of airborne sound at the same time. Comminuted polyurethane soft foams can also be processed together with adherent thermoplastic particles obtained from conventional sound-insulating heavy layers and carpet laminates. The sheets obtained as the products of recycling have thicknesses between 1 and 5 mm.

Depending on the process of production and the density of the material, the sheets obtained as the product of recycling, which have surprisingly good mechanical properties, e.g. in respect of tensile strength, can also be made with adhesive surfaces. They can then be processed in molds to produce known mass-spring systems for sound insulation in such a way that the spring, and thus the whole part, is able to adhere positively to the sheet metal, which in every case leads to increased acoustic effectiveness.

The use of such sheets on their own for sheet metal, that is subject to vibration, for example for automobile bodywork, brings about insulation against both solid-conducted and air-conducted sound at the same time, that means vibration damping and airborne sound insulation.

A further procedure in the recycling of flexible, soft polyurethane foams consists in stuffing the comminuted materials into cushion-shaped pre-cut blanks (Process step 5), e.g. of fleece or foil, which are then welded around the edges. For this process step 5 it is not necessary to carry out a previous classification 3, for example to separate out particles originating from heavy layers. The products made with the use of recycled materials have surprisingly good airborne sound absorbing properties. By control of the amount of stuffing used the flow resistance and thereby the absorbing capacity can be influenced.

With regard to the classification 3 it should be noted that insofar as the starting materials or systems, such as for example upholstered seats from scrap automobiles, contain metal fibers or other hard foreign constituents, the classification 3 should be carried out before producing the recycled material in order to separate out these materials. Natural fibers, on the other hand, such as jute or the like, must be comminuted to grain sizes similar to those of conventional filler materials, i.e. to about the millimeter region, and can then be incorporated into the recycled product. The density of the end products is determined directly by the production process.

Lamination with aluminium foil enables heat resistance up to temperatures of 170° C. to be achieved. Hence these products can be used to cover areas of the bodywork where relatively high temperatures arising from the exhaust system, heat from the motor and thermal radiation from the catalytic converter have to be reckoned with.

TABLE 1

| Basis mat'l | Density of the basis mat'l. (kgm$^{-3}$) | Bulk density of the flakes (kgm$^{-3}$) | Density of the end product (kgm$^{-3}$) | Pressure (bar) | Time (min) | Product structure |
| --- | --- | --- | --- | --- | --- | --- |
| A | 1000 | 450–500 | 1100 | 50 | 3 | loose structure like coarse cork mat. |
| A | 1000 | 450–500 | 1000 | 80 | 3.5 | more solid structure: finer pores in the compact |
| A | 1000 | 450–500 | 1700 | 100 | 4 | microporous structure |
| A | 1000 | 450–500 | 2000 | 150 | 5 | compact sheet |
| B | 60–80 | 65 | 400–1000 | 50–60 | 3 | microporous structure to compact sheet |

Notes:
Basis mat'l A: PU foam with 60-70% mineral filler.
Basis mat'l B: low-density foam with little or usually no filler.
Workpiece temperature in each case 180° C.
End product: 1-5 mm thick sheet.
Press closing rate 1 mm/sec.
Sample size DIN A3.
Time = pressing time required to attain the final thickness for production of the end product.

TABLE 2

| Basis mat'l | Density of the basis mat'l. (kgm$^{-3}$) | Bulk density of the flakes (kgm$^{-3}$) | Density of the end product (kgm$^{-3}$) | Pressure (bar) | Time (min) | Product structure |
| --- | --- | --- | --- | --- | --- | --- |
| C | <100 | 60–70 | ≧1000 | 150 | 5 | compact sheet |

Notes:
Basis mat'l C: unfilled low-density foam (no added material)
Workpiece temperature 185–210° C.
End product thickness ≧1.5 mm.
Other parameters and definitions as Table 1.

What is claimed is:

1. A process for recycling waste thermosetting polyurethane soft foam having a density in the range of 15–1000 kgm$^{-3}$ which comprises the steps of comminuting the soft foam to granules, consolidating the comminuted soft foam in a mold under a pressure between 50 and 150 bar and at an elevated temperature between 180° and 210° C. to a final thickness and pressing it, without addition of polymeric binder, for a predetermined pressing time of about 3 to 5 minutes to form a high-strength sheet.

2. A process according to claim 1, wherein hard foreign constituents are removed from the polyurethane soft foam before the comminution step.

3. A process according to claim 1, wherein said comminuted polyurethane soft foam is processed together with adherent particles originating from a source selected from conventional thermoplastic, sound-insulating heavy layers and carpet laminates.

4. A process according to claim 1, wherein unfilled foams with initial densities of less than 100 kgm$^{-3}$, without adherent foreign particles, are treated to form adhesive-surfaced sheets having final thicknesses not exceeding 1.5 mm and final densities not less than 1000 kgm$^{-3}$.

5. A process according to claim 1, wherein the charging height in the mold is about 30 mm.

6. A process according to claim 1, wherein the density of the end products is between 400 and 2000 kgm$^{-3}$.

7. The use of sheets made by the process of claim 1 for airborne sound insulation in noisy spaces.

8. The use of sheets made according to claim 4 as inlays in acoustic mass-spring systems to increase their airborne sound insulation.

9. The use of sheets made according to claim 4 as inlays in acoustic mass-spring systems for positive coupling to vibrating metal sheet for solid-borne sound insulation and improved airborne sound insulation.

10. The use of sheets made according to claim 4 for solid-borne sound damping of vibrating panels.

11. The use of the comminuted polyurethane soft foam made according to claim 3 as stuffing for airborne sound insulation.

12. The process of claim 1 wherein said sheet is in a form selected from sheets having a loose, cork-mat-like structure, fine-pored sheets, compact sheets, and adhesive surfaced sheets.

13. The process of claim 1 wherein said comminuted soft foam is consolidated to a final thickness of 1 to 7 mm.

14. The process of claim 2 wherein the hard foreign constituents removed from the foam before the comminution step include one or more constituents chosen from metals and hard PVC.

15. The use of sheets made according to claim 1 for airborne sound insulation in automobiles.

16. The use of sheets made according to claim 4 for solid-borne sound damping of vibrating panels in automobile body work.

17. The use of the comminuted polyurethane soft foam made according to claim 3 which are further formed into cushion-shaped pre-cut sheet blanks which are then edge-sealed, as stuffing for airborne sound insulation.

* * * * *